(12) United States Patent
Alaman Aguilar et al.

(10) Patent No.: US 10,194,493 B2
(45) Date of Patent: Jan. 29, 2019

(54) HOUSEHOLD APPLIANCE APPARATUS

(71) Applicant: BSH Bosch und Siemens Hausgeräte GmbH, Munich (DE)

(72) Inventors: Jorge Alaman Aguilar, Saragossa (ES); Rafael Alonso Esteban, Huesca (ES); Miguel Angel Bunuel Magdalena, Saragossa (ES); Enrique Carretero Chamarro, Saragossa (ES); Andres Escartin Barduzal, Saragossa (ES); Francisco Javier Ester Sola, Saragossa (ES); Francisco Javier Pelayo Zueco, Saragossa (ES); Pilar Perez Cabeza, Saragossa (ES); Fernando Planas Layunta, Saragossa (ES); Jesus Mario Subias Domingo, Saragossa (ES); Francisco Villuendas Yuste, Saragossa (ES); Ana Margarita Lopez de Lama, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 482 days.

(21) Appl. No.: 14/037,736

(22) Filed: Sep. 26, 2013

(65) Prior Publication Data
US 2014/0091082 A1    Apr. 3, 2014

(30) Foreign Application Priority Data

Oct. 3, 2012 (ES) .................................. 201231529

(51) Int. Cl.
*H05B 3/68* (2006.01)
*H05B 6/12* (2006.01)
(Continued)

(52) U.S. Cl.
CPC ........... *H05B 6/1209* (2013.01); *A47B 77/08* (2013.01); *C03C 17/36* (2013.01);
(Continued)

(58) Field of Classification Search
CPC . C03C 17/36; C03C 17/3613; C03C 17/3639; C03C 17/3657; C03C 17/3626; H05B 1/00; H05B 1/0252; H05B 1/0266
(Continued)

(56) References Cited

U.S. PATENT DOCUMENTS 3,649,359 A * 3/1972 Apfel et al. ........... G02B 5/285
                                                         359/585
5,484,467 A * 1/1996 Nass et al. ..................... 65/33.4
(Continued)

FOREIGN PATENT DOCUMENTS

EP     1505354 A1    2/2005
EP     2233840 A1    9/2010
(Continued)

OTHER PUBLICATIONS

European Search Report EP 13 18 5857 dated Jan. 17, 2014.

*Primary Examiner* — Dana Ross
*Assistant Examiner* — Ayub Maye
(74) *Attorney, Agent, or Firm* — Michael E. Tschupp; Andre Pallapies; Brandon G. Braun

(57) ABSTRACT

A cooktop apparatus, in particular an induction cooktop apparatus, includes at least one glass unit and at least one coating configured as a multilayer structure, which is disposed on at least one subregion of at least a main face of the glass unit and has at least two layers. In order to achieve optimum compatibility with the sensors of the user interface without requiring a process after deposition, at least one of the layers is formed by at least one semiconducting material, to fulfill the function of an absorbing layer.

20 Claims, 4 Drawing Sheets

(51) Int. Cl.
*A47B 77/08* (2006.01)
*H05B 6/06* (2006.01)
*C03C 17/36* (2006.01)
*C03C 17/42* (2006.01)
*F24C 15/10* (2006.01)

(52) U.S. Cl.
CPC ...... *C03C 17/3626* (2013.01); *C03C 17/3639* (2013.01); *C03C 17/3649* (2013.01); *C03C 17/42* (2013.01); *F24C 15/102* (2013.01); *H05B 6/062* (2013.01); *C03C 2217/72* (2013.01); *H05B 2213/04* (2013.01)

(58) Field of Classification Search
USPC .......................... 219/443.1, 452.12, 620, 622
See application file for complete search history.

(56) References Cited

U.S. PATENT DOCUMENTS

| | | | |
|---|---|---|---|
| 7,105,232 B2* | 9/2006 | Striegler | 428/427 |
| 7,208,703 B2* | 4/2007 | Shimatani et al. | 219/443.1 |
| 7,402,781 B2* | 7/2008 | Kondo | H05B 6/1218 219/620 |
| 7,763,832 B2* | 7/2010 | Striegler et al. | 219/448.11 |
| 2002/0084263 A1* | 7/2002 | Wennemann et al. | 219/460.1 |
| 2007/0003769 A1* | 1/2007 | Striegler | 428/426 |
| 2007/0056961 A1* | 3/2007 | Shimatani et al. | 219/729 |
| 2007/0177065 A1* | 8/2007 | Baier | H03K 17/962 349/12 |
| 2008/0264931 A1* | 10/2008 | Vilato | C03C 17/00 219/622 |
| 2010/0181302 A1 | 7/2010 | Ernst et al. | |
| 2010/0219176 A1* | 9/2010 | Striegler | C03C 17/02 219/443.1 |
| 2010/0264130 A1* | 10/2010 | Ikegami | C03C 17/36 219/620 |
| 2012/0125314 A1 | 5/2012 | Alonso Esteban et al. | |
| 2013/0140293 A1* | 6/2013 | Doerk | C03C 10/0009 219/452.12 |

FOREIGN PATENT DOCUMENTS

| | | |
|---|---|---|
| JP | 2010159171 A * | 7/2010 |
| WO | 2012085821 A1 | 6/2012 |
| WO | 2013001414 A2 | 1/2013 |

* cited by examiner

HOUSEHOLD APPLIANCE APPARATUS

BACKGROUND OF THE INVENTION

The invention relates to a cooktop apparatus.

Cooktops are known which have a multilayer coating for coloring purposes. They consist of layers of metal and insulating materials.

BRIEF SUMMARY OF THE INVENTION

It is an object of the invention to provide an improved cooktop apparatus which obviated prior art shortcomings and hash greater stability and a high level of compatibility with an user interface (UI).

According to one aspect of the invention, a cooktop apparatus, in particular an induction cooktop apparatus, includes at least one glass unit and at least one coating configured as a multilayer structure and disposed on at least one subregion of at least a main face of the glass unit, with the coating having at least two layers, at least one of the layers being formed by at least one semiconducting material.

Currently preferred is the provision of the coating on at least one subregion of a rear side of the glass unit. The coating may have at least four layers, advantageously at least six. Currently preferred is a coating with at least eight layers, with at least three of the layers being advantageously formed by at least one semiconducting material.

To ensure clarity, it is necessary to establish the definition of several important terms and expressions that will be used throughout this disclosure.

The term "glass unit" refers in particular to a unit, which is formed largely, in particular at least 50%, advantageously at least 70%, preferably at least 90%, by a glass-type material.

The term "glass-type material" refers in particular to an at least partially amorphous, in particular transparent, preferably inorganic, material. The glass-type material can be formed in particular by a glass ceramic and/or borosilicate glass. In particular the glass unit has a transparency of at least 50%, advantageously at least 70%, preferably at least 90%.

The term "transparency" refers in particular to transparency at least in the visible light range, in particular at least in the wavelength range between 450 nm and 720 nm. In particular the glass unit is different from a translucent glass unit. The glass unit can preferably be configured as a plate unit, in particular as a cooktop plate unit.

The term "plate unit" refers in particular to a unit, which has a thickness, which is maximum 20%, in particular maximum 10%, advantageously maximum 5%, preferably maximum 1%, of a second longest side.

The term "thickness" of a unit refers in particular to a shortest edge length of a smallest square, which completely encloses the unit.

The term "second longest side" of the unit refers in particular to a second longest edge length of the smallest square, which completely encloses the unit.

The term "cooktop plate unit" refers in particular to a plate unit which is provided to support cookware, in particular a pot, pan or similar, during heating, with energy preferably being transferred to the cooking vessel through the plate unit. In particular the cooktop plate has a high temperature resistance, in particular at least up to 100° C., advantageously at least up to 200° C., preferably at least up to 300° C. In particular a material of the cooktop plate unit has a low linear thermal expansion coefficient value, in particular less than $1 \cdot 10^{-6}$ m/(m·K), advantageously less than $0.5 \cdot 10^{-6}$ m/(m·K), preferably less than $0.1 \cdot 10^{-6}$ m/(m·K).

The term "multilayer structure" refers in particular to a sequence of at least two, in particular at least three, advantageously at least four, preferably at least five, layers. In particular a thickness of a thinnest layer of the multilayer structure here is greater than 0.5%, in particular greater than 1%, advantageously greater than 2%, particularly advantageously greater than 5%, preferably greater than 10%, of a thickness of a thickest layer of the multilayer structure. In particular each layer of the multilayer structure has a thickness, which is less than 2 μm, in particular less than 1.5 μm, preferably less than 1 μm, and in particular greater than 1 nm, advantageously greater than 2 nm, preferably greater than 4 nm. In particular the multilayer structure has a thickness, which is less than 2 μm, in particular less than 1.5 μm, preferably less than 1 μm, and in particular greater than 3 nm, advantageously greater than 6 nm, preferably greater than 9 nm. A first layer of the multilayer structure is preferably in direct contact with the glass unit.

The term "subregion" refers to at least one, in particular just one, cohesive face, which is limited by at least one, in particular just one, closed line.

The term "main face" of the glass unit refers in particular to a continuous, preferably kink-free face, which makes up at least 20%, in particular at least 30%, advantageously at least 40%, preferably at least 45% of a total surface of the glass unit. The "main face" lies at least essentially in one plane. The "rear side" of the glass unit refers in particular to a side of the glass unit, which is different from a side of the glass unit which is directly accessible to an operator when the household appliance apparatus is in an operating state. It can in particular be a lower side of a cooktop plate.

The term "semiconducting material" refers in particular to a material, in particular an alloy or a pure substance, which has a band gap of at least 0.01 eV, in particular at least 0.03 eV, advantageously at least 0.1 eV, preferably at least 0.15 eV. In particular the semiconducting material originates from the group Ge, Si, SiAl, InAs, GaAs, InSb, GaSb and/or alloys thereof.

The term "provided" here in particular relates specifically to formed, designed and/or fitted. The layers of the multilayer structure are preferably applied by means of a PVD method, in particular magnetron sputtering. The coating is provided in particular to color the glass unit. It is possible in particular to achieve greater stability and/or a high temperature resistance. In particular an increased level of flexibility can be achieved in respect of an achievable coating color. It is also possible to achieve optimum compatibility with the UI sensors, without requiring subsequent processing during production.

It is further proposed that the coating can have in addition to the at least one layer formed by a semiconducting material only layers of semiconducting material and/or insulating material. The term "insulating material" refers in particular to a material that has a band gap of at least 3 eV. In particular the insulating material is a material from the group of oxides and/or nitrides of Sn, Zn, Ti, Al, Si, Nb, Ta and/or alloys thereof. In particular layers of the insulating material have a transparency of at least 50%, in particular at least 70%, advantageously at least 90%. In particular at least one terminating layer of the multilayer structure is formed by an insulating material, in order to minimize any chemical influence of ambient air on the layer of semiconducting material. The term "terminating layer" of the multilayer structure refers in particular to a layer of the multilayer structure with the maximum distance from the glass unit of all the layers of the multilayer structure. In particular materials of all the layers of the coating are different from conducting, in particular metal, materials. In particular greater stability can be achieved, as the risk of chemical change is reduced. In particular touch-type operating elements can be disposed and used in a region of the coating without further outlay. This is the main reason for using semiconductors instead of metals.

It is further proposed that the coating can have at least one layer of electrically insulating material which is disposed between at least two layers formed by semiconducting material. In particular it is possible for the coating to have two directly consecutive layers of different electrically insulating materials, which are disposed between at least two layers of semiconducting material or between the glass unit and a semiconducting layer. In particular this allows a high level of flexibility to be achieved in respect of an achievable color.

It is advantageously proposed that the coating can have a transparency of maximum 20%, in particular maximum 10%, advantageously maximum 5%. In particular the coating has a transparency of at least 0.5%, in particular at least 1%, advantageously at least 2%, preferably at least 4%. It is possible in particular to prevent a view into the cooktop apparatus from outside although it is still possible to provide illumination by means of lighting units, in particular LEDs, from the inside outward.

It is further proposed that the multilayer system can have a thickness of maximum 10 µm, in particular maximum 3 µm, preferably maximum 1 µm. It is possible in particular to save materials and/or time.

It is further proposed that the coating can be provided to produce a metallic appearance. That the coating "produces a metallic appearance" means in particular that the coating gives the impression that it is formed by a metal. In particular the coating has a coloring that gives a metallic impression. A "coloring with a metallic impression" refers in particular to a coloring that has a reflectance between 15% and 80%, in particular between 20% and 70%, preferably between 25% and 60%. In particular a "metallic black" coloring can be achieved, wherein reflectance in the visible frequency range is less than 15%, in particular less than 10%. In particular a "stainless steel colored" coloring can be achieved, wherein reflectance in the visible frequency range is between 20% and 60% and color coordinates in the L*a*b* color space have values for a* and b*, which are less than 10. In particular a "colored metal" coloring can be achieved, wherein the color coordinates in the L*a*b* color space have values for a* and b*, which are greater than 10. It is possible in particular to enhance user friendliness.

It is further proposed that the cooktop apparatus can have at least one electronic unit, which is provided to measure and evaluate at least one electrical characteristic at least of the one layer formed by a semiconducting material. In particular the electronic unit has at least one control unit. A "control unit" refers in particular to an electronic unit, which is preferably at least partially integrated in a control and/or regulating unit of a cooktop. The control unit preferably comprises a computation unit and in particular in addition to the computation unit a storage unit with a control and/or regulating program stored therein, which is provided to be run by the computation unit. In particular the electronic unit comprises at least one sensor unit, in particular at least one resistance sensor, which is provided to determine a resistance of the layer of semiconducting material. In particular the electronic unit is provided to detect at least one safety parameter. A safety parameter refers in particular to a parameter which is of relevance to the safety of an operator. In particular the electronic unit is provided to ascertain the intactness of the glass unit and/or the temperature of the glass unit. In particular the electronic unit is provided to perform an action, in particular an emergency disconnection, as a function of a variable of the electrical characteristic. In particular the electronic unit is provided to measure the electrical characteristics of a number of semiconducting layers, whereby in particular measurement sections of the different layers of semiconducting material intersect when projected onto the glass unit. It is possible in particular to achieve a high level of safety.

Further advantages will emerge from the description of the drawing which follows. The drawing shows exemplary embodiments of the invention. The drawing, description and claims contain numerous features in combination. The person skilled in the art will expediently also consider said features individually and group them together to create further useful combinations.

DETAILED DESCRIPTION OF EXEMPLARY EMBODIMENTS OF THE PRESENT INVENTION

Figure 1:
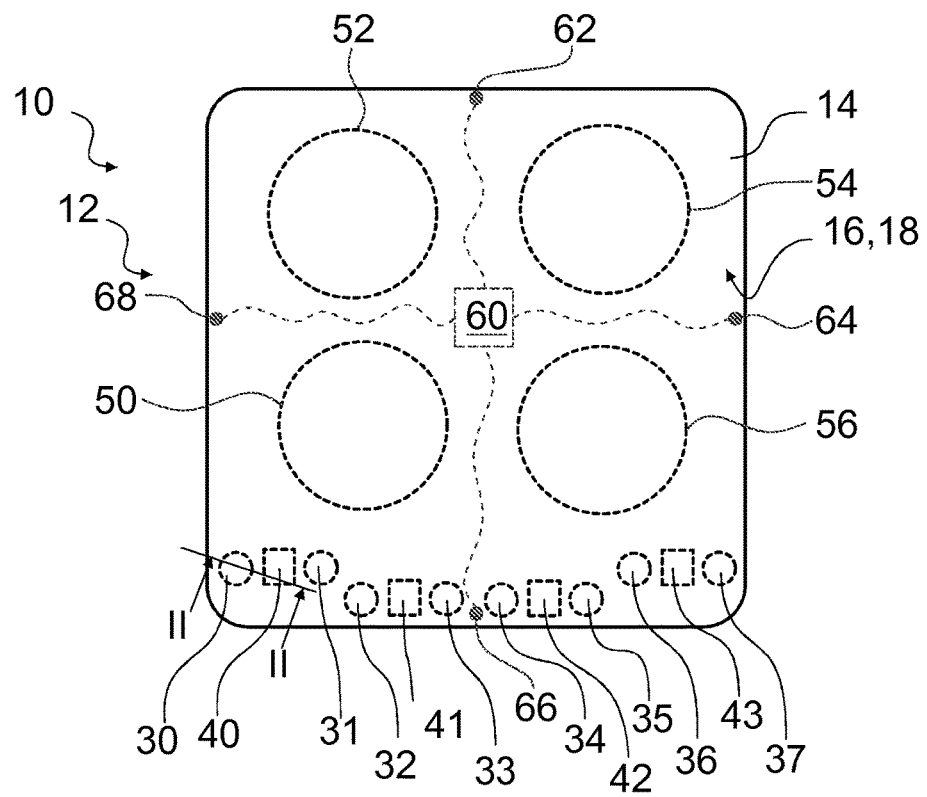
FIG. 1 shows an inventive cooktop viewed from above.
Figure 2:
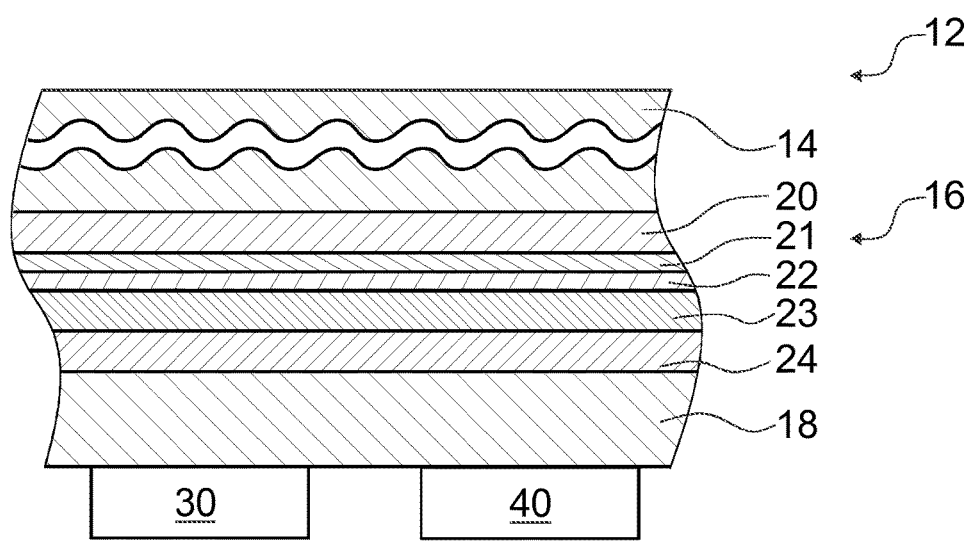
FIG. 2 shows a cross-section along the line II-II in FIG. 1.

FIG. 1 shows a cooktop 10 configured as an induction cooktop, with a cooktop apparatus 12 configured as an induction cooktop apparatus. The cooktop apparatus 12 has a glass unit 14 configured as a cooktop plate unit. The glass unit 14 has four cooking zones identified by means of markings 50, 52, 54, 56. The markings 52, 54, 56, 58 are configured as silkscreen printing but can alternatively also be configured as laser engraving inside the glass unit 14 or similar. The cooktop apparatus 12 also has four inductors, which are disposed on a side of the glass unit 14 facing away from an operator. The inductors are disposed below the cooking zones. The cooktop apparatus 12 also has a coating 16 configured as a multilayer structure, which is disposed on an entire rear side of the glass unit 14. The coating 16 also has five layers 20, 21, 22, 23, 24. The layers 20, 21, 22, 23, 24 are formed alternately by semiconducting and insulating materials (FIG. 2). The cooktop apparatus 12 also has eight touch-sensitive sensors 30, 31, 32, 33, 34, 35, 36, 37, which are disposed on the rear side of the glass unit 14 behind the coating 16. The touch-sensitive sensors 30, 31, 32, 33, 34, 35, 36, 37 are provided to set heat outputs of the inductors. The cooktop apparatus 12 also has four display units 40, 41, 42, 43 configured as segment displays. The display units 40, 41, 42, 43 are disposed on a rear side of the glass unit 14 behind the coating 16. The display units 40, 41, 42, 43 are disposed in each instance between two touch-sensitive sensors 30, 31 and 32, 33 and 34, 35 and 36, 37. The display units 40, 41, 42, 43 are provided in each instance to display heat outputs assigned to the heating zones in the form of power stages. The coating 16 extends here both over a region in which the heating zones are disposed and an operator interface region in which the display units 40, 41, 42, 43 and the touch-sensitive sensors 30, 31, 32, 33, 34, 35, 36, 37 are disposed.

FIG. 2 shows a cross section through the glass unit 14, with a touch-sensitive sensor 30 and a display unit 40 being cut through. The coating 16 only has layers 20, 21, 22, 23, 24 of semiconducting material and/or insulating material. A first layer 20 adjoins the glass unit 14, which is made of transparent glass ceramic. The first layer 20 is formed by an insulating material. The first layer 20 is formed by silicon aluminum nitride ($SiAlN_x$). The first layer 20 has a thickness of 70 nm. A second layer 21 adjoins the first layer 20. The second layer 21 is formed by a semiconducting material. The second layer 21 is formed by germanium. The second layer 21 has a thickness of 8 nm. A third layer 22 adjoins the second layer 21. The third layer 22 is formed by an insulating material. The third layer 22 is formed by silicon aluminum nitride. The third layer 22 has a thickness of 30 nm. A fourth layer 23 adjoins the third layer 22. The fourth layer 23 is formed by a semiconducting material. The fourth layer 21 is formed by germanium. The fourth layer 23 has a thickness of 60 nm. A fifth, terminating layer 24 adjoins the fourth layer 23. The terminating layer 24 is formed by an insulating material. The terminating layer 21 is formed by silicon aluminum nitride. The terminating layer 24 has a thickness of 50 nm. The coating 16 therefore has a third layer 22 of electrically insulating material which is disposed between two layers 21, 23 formed by semiconducting material. The coating 16 also comprises two layers 21, 23 which are disposed in each instance directly between two layers 20, 22 and 22, 24 of insulating material. The layers 20, 21, 22, 23, 24 of the coating 16 are applied by magnetron sputtering, a PVD method. The coating 16, which is configured as a multilayer structure, is covered by a protective coating 18, which is formed by a transparent acrylic lacquer. The protective coating 18 has a thickness of 200 μm. The protective coating 18 serves to protect the coating 16 configured as a multilayer coating mechanically.

The markings 50, 52, 54, 56 configured as silkscreen printing are disposed on a lower side of the glass unit 14. The markings 50, 52, 54, 56 are applied before the coating 16 so that the first layer 20 adjoins the marking 50, 52, 54, 56 instead of the glass unit 14 in the region of the markings 50, 52, 54, 56. This means that the markings 50, 52, 54, 56 are clearly visible.

The cooktop apparatus 12 also has an electronic unit 60, which is provided to measure and evaluate resistances of the two layers 21, 23 of semiconducting material. The electronic unit 60 is provided to measure a resistance of the second layer 21 between a contact 68 on the left edge of the glass unit 14 and a contact 64 on the right edge of the glass unit 14. The electronic unit 60 is provided to measure a resistance of the fourth layer 23 between a contact 62 on the rear edge of the glass unit 14 and a contact 66 on the front edge of the glass unit 14. The electronic unit 60 is provided to detect safety parameters by evaluating the electrical characteristic. The electronic unit 60 is provided to detect a mean temperature of the glass unit 14. The electronic unit 60 is also provided to detect a fracture of the glass unit 14. The electronic unit 60 is provided to perform a power reduction if a limit temperature is exceeded and to perform an emergency disconnection if the glass unit 14 fractures.

The touch-sensitive sensor 30 is disposed directly on the protective coating 18. The protective coating 18 prevents damage to, for example scratching of, the coating 16 during assembly of the touch-sensitive sensor 30. The touch-sensitive sensor 30 is bonded to the protective coating 18. The touch-sensitive sensor 30 is configured as a capacitive sensor, which changes capacitance at the approach for example of a finger of an operator. In this process a measurement is taken through the glass unit 14. As the layers 20, 21, 22, 23, 24 of the multilayer structure are formed from insulating and semiconducting materials, the coating 16 can be configured continuously over the touch-sensitive sensor 30. The display unit 40 has segments formed by LEDs. The same applies here to the touch-sensitive sensors 31, 32, 33, 34, 35, 36, 37 and the display units 41, 42, 43 as to the touch-sensitive sensor 30 and the display unit 40.

Arrangements are also possible, in which the protective coating 18 is omitted and/or in which the touch-sensitive sensor 30 is applied directly to the coating 16 and/or in which the touch-sensitive sensor 30 is disposed between the coating 16 and the protective coating 18, in particular is configured as a coating itself.

Figure 3:
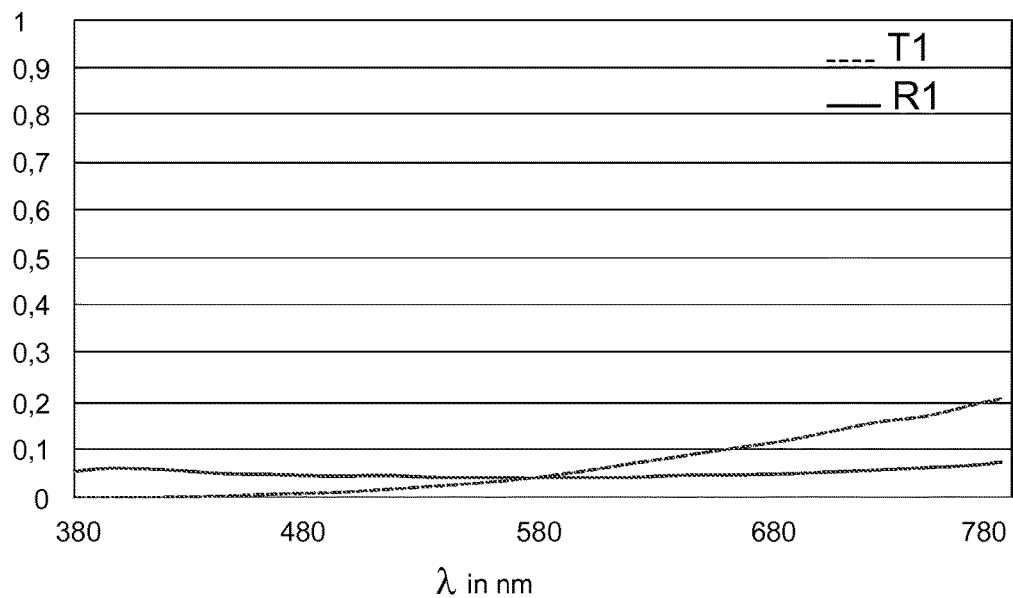
FIG. 3 shows a transmittance/reflectance spectrum of a first exemplary embodiment.

FIG. 3 shows a transmittance/reflectance spectrum for the described coating 16. A transmittance T1 and a reflectance R1 are shown as a function of a wavelength λ. For the spectral range between 380 nm and 780 nm the coating 16 together with the glass unit of the cooktop has an essentially constant reflectance of 6% at the side of the glass unit (this varies as a function of the respective side). The coating 16 is provided to give a metallic black appearance. In the L*a*b* color space a color of the coating 16 is present at L*=26.1, a*=1.3, b*=−3.3. The coating also has a transmittance T1 that rises continuously from 0% to 20% in the spectral range between 380 nm and 780 nm. This results in a visible transmittance of 3.9%. Light from LEDs in the display unit 40 is therefore visible through the coating 16 and the protective coating 18.

Embodiments are also possible, in which markings and/or decorative elements produced by laser processing and/or silkscreen printing are applied to the rear side or a front side of the glass unit 14 or in which markings are burned into the glass unit 14 by laser processing.

FIGS. 4 to 8 show transmittance/reflectance spectra of further inventive embodiments. The transmittances T2, T3, T4, T5 and the reflectances R2, R3, R4, R5 are shown respectively as a function of the wavelength λ. A similar embodiment of the cooktop apparatus 12 to the one in FIGS. 1 and 2 is assumed. Only the parameters of the coating 16 are different.

Figure 4:
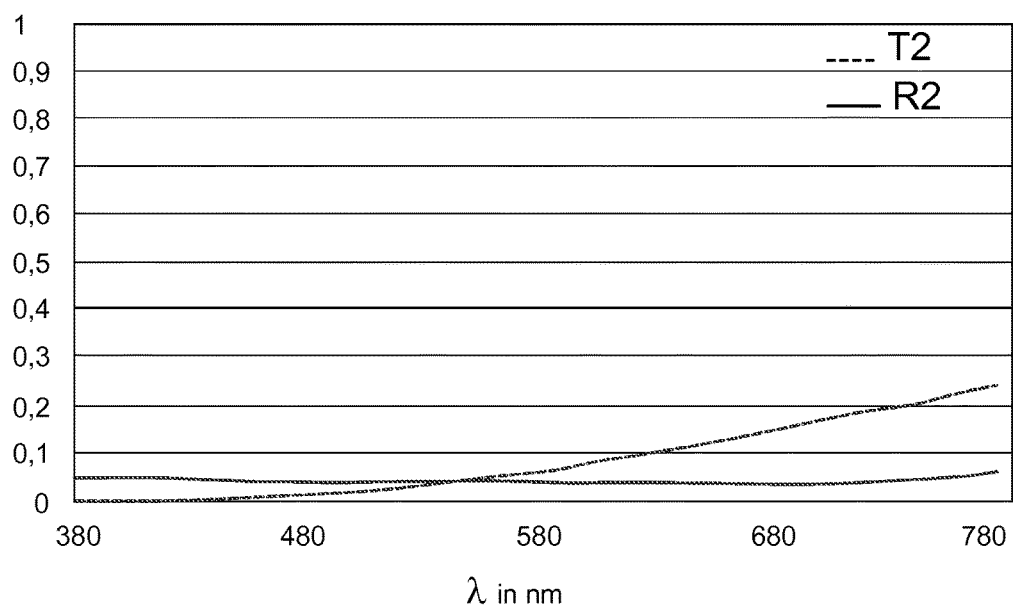
FIG. 4 shows a transmittance/reflectance spectrum of a second exemplary embodiment.

FIG. 4 shows a transmittance/reflectance spectrum of a further exemplary embodiment. A transmittance T2 and a reflectance R2 are shown as a function of a wavelength λ. A coating configured as a multilayer structure is formed here by five layers, these being formed alternately by insulating and semiconducting materials. A first layer, which adjoins the glass unit and is formed by an insulating material, is formed by 50 nm silicon aluminum nitride. A following second layer, which is formed by semiconducting material, is formed by 7 nm germanium. A third layer, which adjoins the second layer and is formed by an insulating material, is formed by 20 nm silicon aluminum nitride. A fourth layer, which adjoins the third layer and is formed by semiconducting material, is formed by 51 nm germanium. A fifth, terminating layer, which follows the fourth layer and is formed by an insulating material, is formed by 50 nm silicon aluminum nitride. The coating is provided to produce a black metallic appearance. For the spectral range between 380 nm and 780 nm the coating together with the glass unit of the cooktop has an essentially constant reflectance of 5% at the side of the glass unit. In the L*a*b* color space a color of the coating is present at L*=25.9, a*=0.3, b*=−0.9. The coating also has a transmittance that rises continuously from 0% to 25% in the spectral range between 380 nm and 780 nm. This results in a mean transmittance of 5.8%. Light from LEDs in display units is therefore visible through the coating.

Figure 5:
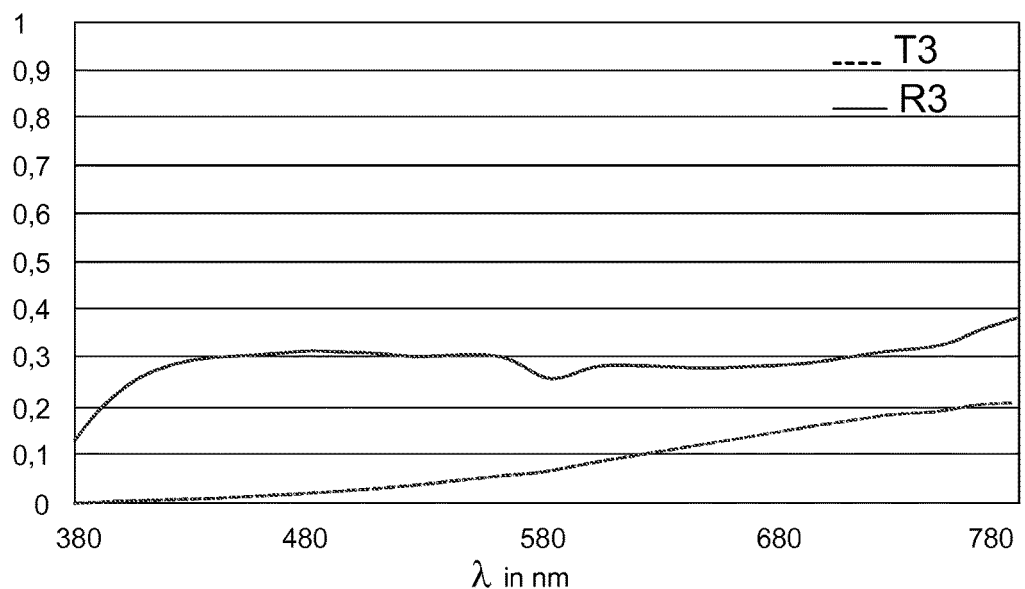
FIG. 5 shows a transmittance/reflectance spectrum of a third exemplary embodiment.

FIG. 5 shows a transmittance/reflectance spectrum of a further exemplary embodiment. A transmittance T3 and a reflectance R3 are shown as a function of a wavelength λ. A coating configured as a multilayer structure is formed here by two layers. A first layer, which adjoins the glass unit and is formed by semiconducting material, is formed by 60 nm germanium. A second layer, which adjoins the first layer and is formed by an insulating material, is formed by 50 nm silicon aluminum nitride. The coating is provided to produce a stainless steel-type metallic appearance. For the spectral range between 420 nm and 740 nm the coating together with the glass unit of the cooktop has an essentially constant reflectance of 30% at the side of the glass unit. In the L*a*b* color space a color of the coating is present at L*=61.2, a*=−3.0, b*=−1.3. The coating also has a transmittance that rises continuously from 0% to 20% in the spectral range between 380 nm and 780 nm. This results in a mean transmittance of 5.9%. Light from LEDs in display units is therefore visible through the coating.

Figure 6:
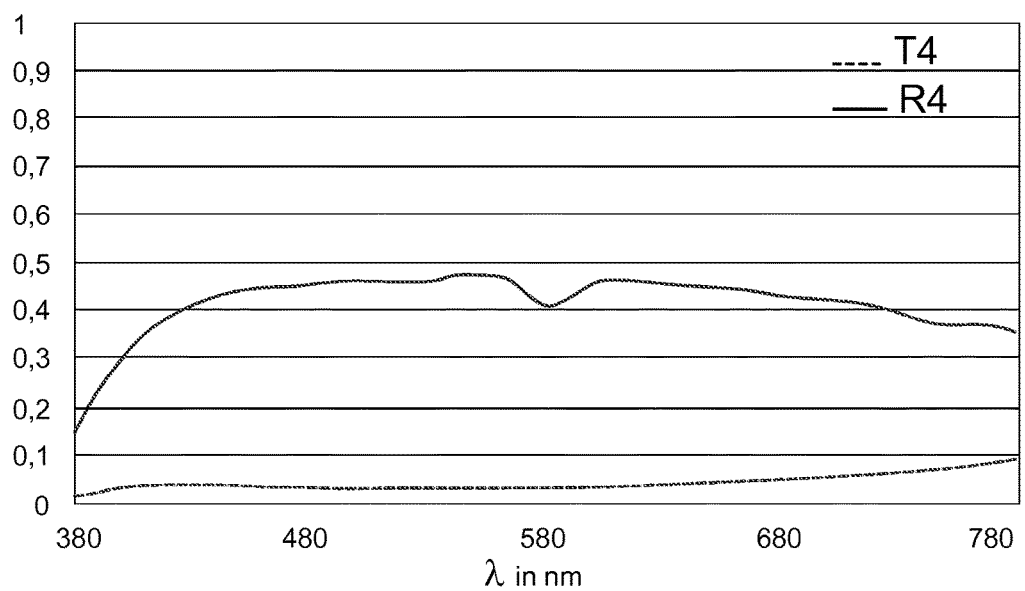
FIG. 6 shows a transmittance/reflectance spectrum of a fourth exemplary embodiment.

FIG. 6 shows a transmittance/reflectance spectrum of a further exemplary embodiment. A transmittance T4 and a reflectance R4 are shown as a function of a wavelength λ. A coating configured as a multilayer structure is formed here by four layers, these being formed alternately by insulating and semiconducting materials. A first layer, which adjoins the glass unit, is formed by a semiconducting material. The first layer is formed by 25 nm germanium. A second layer, which adjoins the first layer and is formed by an insulating material, is formed by 80 nm silicon aluminum nitride. A third layer, which adjoins the second layer and is formed by semiconducting material, is formed by 15 nm germanium. A fourth, terminating layer, which follows the third layer and is formed by an insulating material, is formed by 50 nm silicon aluminum nitride. The coating is provided to produce a stainless steel-type metallic appearance. For the spectral range between 440 nm and 720 nm the coating together with the glass unit of the cooktop has an essentially constant reflectance of 45% at the side of the glass unit. In the L*a*b* color space a color of the coating is present at L*=73.2, a*=−2.5, b*=−2.4. The coating also has an essentially constant transmittance of 4% in the spectral range between 440 nm and 730 nm. Light from LEDs in display units is therefore visible through the coating. Better visibility of blue and green LEDs can be achieved compared with the previous exemplary embodiment.

Figure 7:
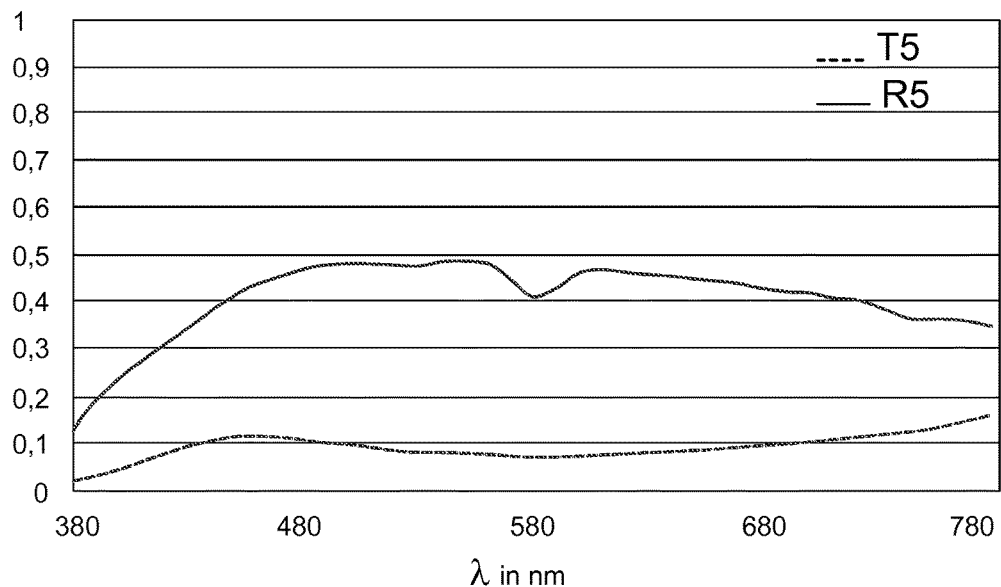
FIG. 7 shows a transmittance/reflectance spectrum of a fifth exemplary embodiment.

FIG. 7 shows a transmittance/reflectance spectrum of a further exemplary embodiment. A transmittance T5 and a reflectance R5 are shown as a function of a wavelength λ. A coating configured as a multilayer structure is formed here by four layers, these being formed alternately by insulating and semiconducting materials. A first layer, which adjoins the glass unit, is formed by a semiconducting material. The first layer is formed by 20 nm germanium. A second layer, which adjoins the first layer and is formed by an insulating material, is formed by 100 nm silicon aluminum nitride. A third layer, which adjoins the second layer and is formed by semiconducting material, is formed by 9 nm germanium. A fourth, terminating layer, which follows the third layer and is formed by an insulating material, is formed by 50 nm silicon aluminum nitride. The coating is provided to produce a stainless steel-type metallic appearance. For the spectral range between 440 nm and 720 nm the coating together with the glass unit of the cooktop has an essentially constant reflectance of 46% at the side of the glass unit. In the L*a*b* color space a color of the coating is present at L*=73.8, a*=−5.6, b*=6.7. The coating also has an essentially constant transmittance of 10% in the spectral range between 440 nm and 730 nm. Light from LEDs in display units is therefore visible through the coating. Better visibility of LEDs can be achieved compared with the previous exemplary embodiment.

Figure 8:
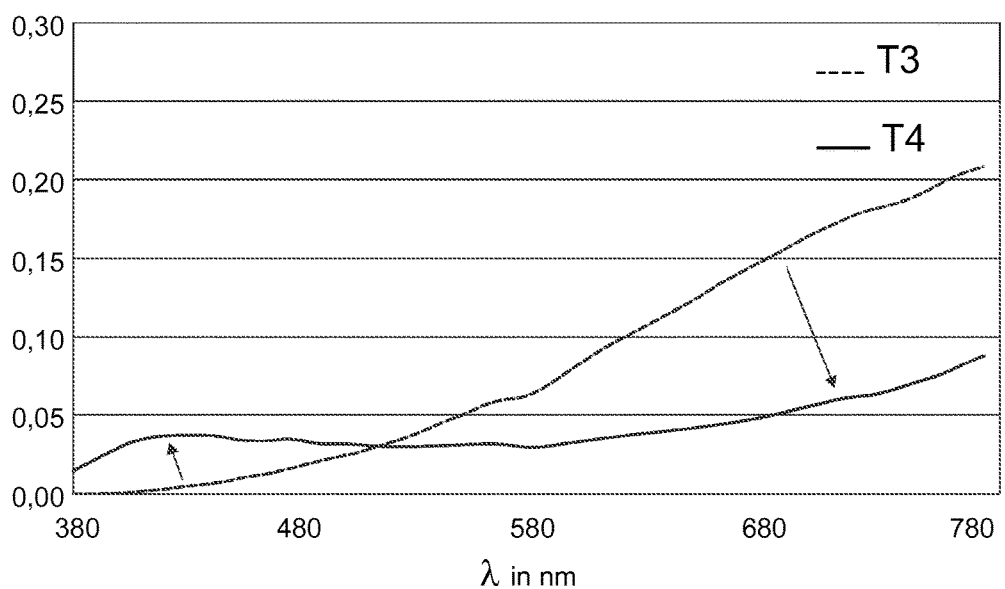
FIG. 8 shows a comparison of the transmittances T3, T4 from the third and fourth exemplary embodiments.

FIG. 8 shows a comparison of the transmittances T3, T4 of the third and fourth exemplary embodiments. By adjusting the number of layers, in this instance increasing it from two to four, it is possible to adjust the transmittance T3, T4 while maintaining the same coloring. Thus the transmittance has been reduced in the large wavelength λ range and increased in the small wavelength λ range, resulting in an essentially constant transmittance, which equalizes differently emitting lighting elements.

The described coatings 16, which are configured as multilayer structures, each have a thickness between 110 nm and 220 nm. Semiconducting Ge layers are provided in the described exemplary embodiments. Comparable results can also be achieved with the other materials cited above.

Embodiments of the coating with up to eight insulating layers and up to three semiconducting layers are also conceivable.

What is claimed is:

1. A cooktop apparatus, comprising:
    a glass unit;
    a touch-sensitive sensor that senses a touch by a user of the cooktop to control a function of the cooktop; and
    a coating configured as a multilayer structure and disposed on at least one subregion of a main face of the glass unit between the glass unit and the touch-sensitive sensor, said coating having
        a first layer formed by a semiconducting material;
        a second layer formed by a semiconducting material; and
        an insulating layer which is formed of electrically insulating material and disposed between the first layer and the second layer.

2. The cooktop apparatus of claim 1, constructed in the form of an induction cooktop apparatus.

3. The cooktop apparatus of claim 1, wherein the glass unit is designed as a cooktop plate unit.

4. The cooktop apparatus of claim 1, wherein the coating has a transparency of maximum 20%.

5. The cooktop apparatus of claim 1, wherein the coating has a thickness of maximum 10 μm.

6. The cooktop apparatus of claim 1, wherein the coating is configured to produce a metallic appearance.

7. The cooktop apparatus of claim 1, further comprising at least one electronic unit configured to measure and evaluate at least one electrical characteristic of the first layer.

8. The cooktop apparatus of claim 1, further comprising a protective coating positioned on the multilayer coating, wherein the touch-sensitive sensor is positioned on the protective coating.

9. The cooktop apparatus of claim 1, further comprising a protective coating, wherein the touch-sensitive sensor is positioned between the multilayer coating and the protective coating.

10. The cooktop apparatus of claim 7, wherein the electronic unit is configured to detect at least one safety parameter.

11. A cooktop, comprising:
at least one cooktop apparatus including
a glass unit,
a touch-sensitive sensor that senses a touch by a user of the cooktop to control a function of the cooktop, and
a coating configured as a multilayer structure and disposed on at least one subregion of a main face of the glass unit between the glass unit and the touch-sensitive sensor, said coating having
a first layer formed by a semiconducting material;
a second layer formed by a semiconducting material; and
an insulating layer which is formed of electrically insulating material and disposed between the first layer and the second layer.

12. The cooktop of claim 11, constructed in the form of an induction cooktop.

13. The cooktop of claim 11, wherein the glass unit is designed as a cooktop plate unit.

14. The cooktop of claim 11, wherein the coating has a transparency of maximum 20%.

15. The cooktop of claim 11, wherein the coating has a thickness of maximum 10 μm.

16. The cooktop of claim 11, wherein the coating is configured to produce a metallic appearance.

17. The cooktop of claim 11, wherein the cooktop apparatus includes at least one electronic unit configured to measure and evaluate at least one electrical characteristic of the first layer.

18. The cooktop of claim 11, further comprising a protective coating positioned on the multilayer coating, wherein the touch-sensitive sensor is positioned on the protective coating.

19. The cooktop of claim 11, further comprising a protective coating, wherein the touch-sensitive sensor is positioned between the multilayer coating and the protective coating.

20. The cooktop of claim 17, wherein the electronic unit is configured to detect at least one safety parameter.

* * * * *